United States Patent
Gates

(10) Patent No.: US 12,054,984 B2
(45) Date of Patent: Aug. 6, 2024

(54) ESCAPE DOOR ASSEMBLY FOR STORM SHELTER

(71) Applicant: Brian K. Gates, Vian, OK (US)

(72) Inventor: Brian K. Gates, Vian, OK (US)

( * ) Notice: Subject to any disclaimer, the term of this patent is extended or adjusted under 35 U.S.C. 154(b) by 343 days.

(21) Appl. No.: 17/338,013

(22) Filed: Jun. 3, 2021

(65) Prior Publication Data

US 2021/0388669 A1 Dec. 16, 2021

Related U.S. Application Data

(60) Provisional application No. 63/039,127, filed on Jun. 15, 2020.

(51) Int. Cl.
*E06B 5/01* (2006.01)
*E04F 11/06* (2006.01)
*E04H 9/14* (2006.01)
*E06B 5/12* (2006.01)
*E06C 9/08* (2006.01)

(52) U.S. Cl.
CPC .............. *E06B 5/12* (2013.01); *E04F 11/064* (2013.01); *E04H 9/14* (2013.01); *E06B 5/01* (2013.01); *E06C 9/08* (2013.01)

(58) Field of Classification Search
CPC ... E04H 9/14; E04H 9/145; E06B 5/12; E06B 5/01; E06B 5/02; Y02A 10/30; Y02A 50/00; E06C 7/082; E06C 9/08; E04F 11/064
See application file for complete search history.

(56) References Cited

U.S. PATENT DOCUMENTS

| | | | | |
|---|---|---|---|---|
| 172,830 | A * | 2/1876 | Stewart et al. | E04F 11/064 182/98 |
| 2,072,328 | A * | 3/1937 | Gilpin | B61D 17/16 105/377.01 |
| 2,260,938 | A * | 10/1941 | Gilpin | B61D 17/16 52/19 |
| 2,321,499 | A * | 6/1943 | Marschke | E04F 11/04 182/81 |
| 2,572,281 | A * | 10/1951 | Pierce | E04F 11/064 182/78 |
| 2,852,176 | A * | 9/1958 | Harmon | E04F 11/064 182/98 |

(Continued)

FOREIGN PATENT DOCUMENTS

| | | | | |
|---|---|---|---|---|
| BE | 830711 | A * | 10/1975 | E04F 11/06 |
| CA | 3004242 | A1 * | 11/2018 | E04B 9/003 |

(Continued)

*Primary Examiner* — Brent W Herring
(74) *Attorney, Agent, or Firm* — Dunlap Codding, P.C.

(57) ABSTRACT

A storm shelter escape door assembly includes a frame and a door hinged to the frame. The frame includes three inner sidewalls, an open end, and a horizontal attachment plate extending outwardly from upper edges of the inner sidewalls. The door has at least three outer sidewalls joined by a door face. The door is hinged to the frame adjacent the open end and below the horizontal attachment plate so the door is openable in an inward direction away from the horizontal attachment plate. When the door is in a closed position, the door face angles downwardly toward the open end to cause water to run off the door.

10 Claims, 6 Drawing Sheets

(56) References Cited

U.S. PATENT DOCUMENTS

| | | | | |
|---|---|---|---|---|
| 3,051,261 A | * | 8/1962 | Webb, Sr. | E04F 11/068 182/78 |
| 3,155,057 A | | 11/1964 | Ayres | |
| 3,521,414 A | * | 7/1970 | Malissa | E04D 13/031 285/43 |
| 3,665,661 A | * | 5/1972 | Beckerer | B63B 19/14 52/200 |
| 3,807,528 A | * | 4/1974 | Frank | E04D 13/035 182/81 |
| 3,842,935 A | * | 10/1974 | Frank | E04D 13/035 182/81 |
| 3,896,595 A | * | 7/1975 | Anghinetti | E05C 3/12 49/386 |
| 3,901,353 A | * | 8/1975 | Skolnik | E04F 11/064 182/78 |
| 4,413,450 A | * | 11/1983 | Brower | E04D 13/1407 52/27 |
| 4,541,508 A | * | 9/1985 | Lundh | E04F 11/064 182/78 |
| 4,615,158 A | * | 10/1986 | Thornton | E04B 1/34336 52/182 |
| 4,642,952 A | * | 2/1987 | Prandin | E04H 9/12 109/1 S |
| 4,792,015 A | * | 12/1988 | Brudi | E06C 9/08 182/19 |
| 4,805,736 A | * | 2/1989 | Byrnes, Jr. | E06C 9/08 182/95 |
| 5,050,706 A | * | 9/1991 | Cole | E04F 11/064 182/78 |
| 5,103,934 A | * | 4/1992 | Brooks | E04F 11/068 182/86 |
| 5,239,795 A | * | 8/1993 | Breaux | E04F 11/064 52/28 |
| 5,373,665 A | * | 12/1994 | Lyons, Sr. | E04D 13/0354 49/386 |
| 5,428,925 A | * | 7/1995 | Snyder | E06B 5/01 49/367 |
| 5,600,921 A | * | 2/1997 | Vardaro | E05C 9/047 49/386 |
| 5,829,380 A | * | 11/1998 | Smith | B63B 27/143 182/206 |
| 6,321,491 B1 | * | 11/2001 | DiMauro | E06B 5/01 52/21 |
| 6,385,920 B1 | * | 5/2002 | Chandler | E04H 9/12 52/169.7 |
| 6,401,409 B1 | * | 6/2002 | Martin | E04H 9/12 52/21 |
| 6,662,901 B1 | * | 12/2003 | Appl | E04F 11/064 182/78 |
| 6,991,063 B2 | * | 1/2006 | Latimer | E06C 1/387 182/78 |
| 7,165,649 B2 | * | 1/2007 | Latimer | E04F 11/064 182/77 |
| 7,237,362 B2 | | 7/2007 | Bishop | |
| 7,578,371 B2 | * | 8/2009 | Allred, III | E04F 11/064 182/163 |
| 7,717,231 B2 | * | 5/2010 | Horton | E06C 7/006 182/106 |
| 8,286,752 B2 | * | 10/2012 | McIntire | E04F 11/064 182/78 |
| 8,397,432 B1 | | 3/2013 | Ferez | |
| 8,887,448 B2 | * | 11/2014 | VanMeter | H02G 9/10 52/19 |
| 8,925,261 B1 | | 1/2015 | Kouba | |
| 8,925,686 B2 | * | 1/2015 | Saint-Jalmes | B64D 11/00 244/129.6 |
| 9,555,872 B2 | | 1/2017 | Salgues et al. | |
| 9,695,630 B1 | * | 7/2017 | Arthur | E04B 1/76 |
| 10,428,548 B2 | | 10/2019 | Yano | |
| 2003/0172596 A1 | | 9/2003 | Talley et al. | |
| 2005/0029042 A1 | * | 2/2005 | Latimer | E04F 11/064 182/77 |
| 2005/0029044 A1 | * | 2/2005 | Latimer | E06C 1/32 182/78 |
| 2006/0032154 A1 | * | 2/2006 | Johnson | E04H 9/14 52/36.1 |
| 2007/0234654 A1 | * | 10/2007 | Eriksson | E04F 11/062 52/184 |
| 2010/0192487 A1 | * | 8/2010 | Thornton | E04F 11/064 52/741.2 |
| 2013/0212954 A1 | * | 8/2013 | Taylor | E06B 5/10 52/741.1 |
| 2019/0063073 A1 | * | 2/2019 | Woodward | E04B 9/003 |
| 2019/0211561 A1 | * | 7/2019 | Dempster | E05F 1/1091 |
| 2021/0010271 A1 | * | 1/2021 | Burger | B64D 11/00 |

FOREIGN PATENT DOCUMENTS

| | | | | |
|---|---|---|---|---|
| DE | 3814134 A | * | 11/1989 | E04F 11/04 |
| EP | 2108761 A2 | * | 10/2009 | E04F 11/064 |
| EP | 2740857 A2 | * | 6/2014 | E04F 11/064 |
| EP | 3040492 A1 | * | 7/2016 | |
| EP | 2636814 B1 | * | 1/2018 | E04F 11/06 |
| EP | 3578435 | | 11/2019 | |
| GB | 2122671 A | * | 1/1984 | E02D 29/1418 |
| GB | 2185771 A | * | 7/1987 | E06B 3/9641 |
| GB | 2378204 A | * | 2/2003 | E05C 17/04 |
| KR | 1037582 B1 | * | 5/2011 | |

* cited by examiner

ESCAPE DOOR ASSEMBLY FOR STORM SHELTER

CROSS REFERENCE TO RELATED APPLICATIONS

The present application claims priority to a provisional patent application identified by U.S. Ser. No. 63/039,127, filed Jun. 15, 2020, the entire contents of which are hereby incorporated herein by reference.

BACKGROUND

Storm shelters are widely used in areas subject to violent storms such as hurricanes or tornadoes. Storm shelters must have a door or hatch for entrance and exit. These doors are generally swung or moved to the outside rather than to the inside. This allows the door to be more water tight. However, such storm shelter doors can be damaged during the storm rendering them inoperable. For example, debris can be deposited on top of the door keeping it from being opened and leaving the occupant trapped inside the shelter. It would be desirable to provide a storm shelter escape door that can be opened from the inside without requiring it to swing or move outward, and that remains water tight.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION OF EXEMPLARY EMBODIMENTS

Figure 1:
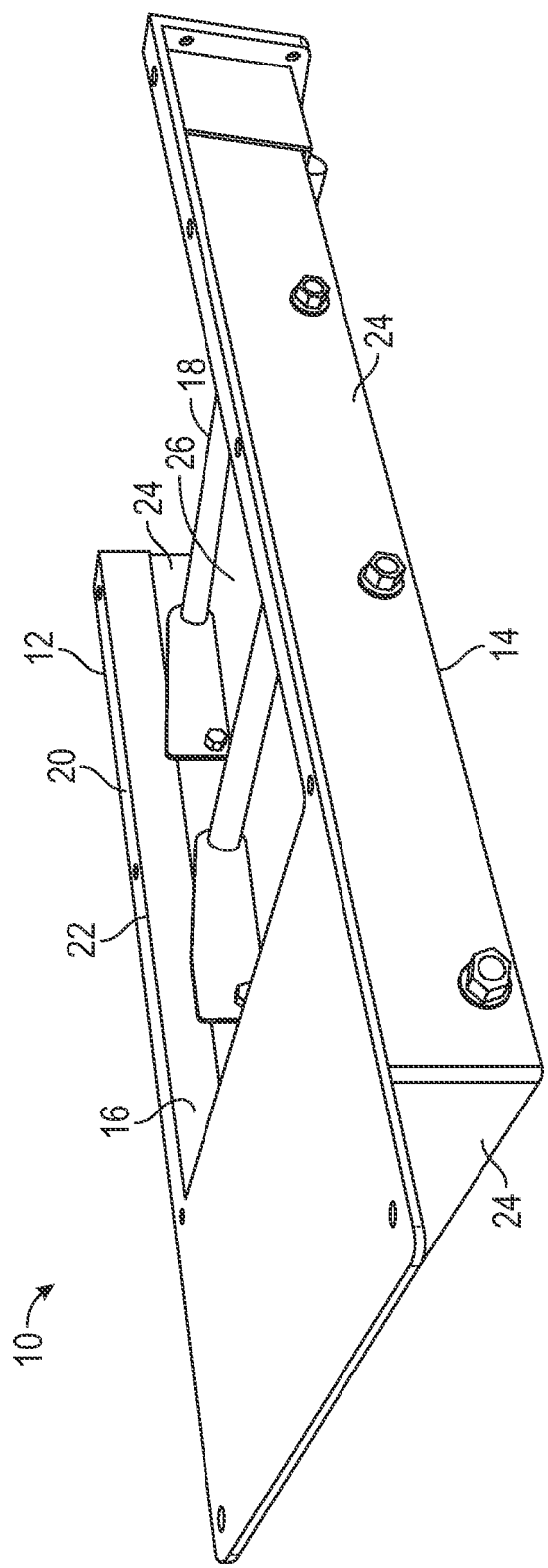
FIG. 1 is a perspective view of an escape door assembly constructed in accordance with inventive concepts disclosed herein.

Before explaining at least one embodiment of the presently disclosed inventive concept(s) in detail, it is to be understood that the presently disclosed inventive concept(s) is not limited in its application to the details of construction and the arrangement of the components or steps or methodologies set forth in the following description or illustrated in the drawings. The presently disclosed inventive concept(s) is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the presently disclosed inventive concept(s) shall have the meanings commonly understood by those of ordinary skill in the art. Further, unless otherwise required by context, singular terms shall include pluralities and plural terms shall include the singular.

The articles and/or methods disclosed herein can be made and executed without undue experimentation in light of the present disclosure. While the articles and methods of the presently disclosed inventive concept(s) have been described in terms of preferred embodiments, it will be apparent to those of skill in the art that variations may be applied to the articles and/or methods and in the steps or in the sequence of steps of the method described herein without departing from the concept, spirit, and scope of the presently disclosed inventive concept(s). All such similar substitutes and modifications apparent to those skilled in the art are deemed to be within the spirit, scope, and concept of the presently disclosed inventive concept(s).

As utilized in accordance with the present disclosure, the following terms, unless otherwise indicated, shall be understood to have the following meanings:

The use of the word "a" or "an" when used in conjunction with the term "comprising" in the claims and/or the specification may mean "one", but it is also consistent with the meaning of "one or more," "at least one," and "one or more than one." The use of the term "or" in the claims is used to mean "and/or" unless explicitly indicated to refer to alternatives only or that the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely to differentiate between two or more items and is not meant to imply any sequence or order or importance to one item over another or any order of addition, for example.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. The term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

The term "associate" as used herein will be understood to refer to the direct or indirect connection of two or more items.

Figure 7:
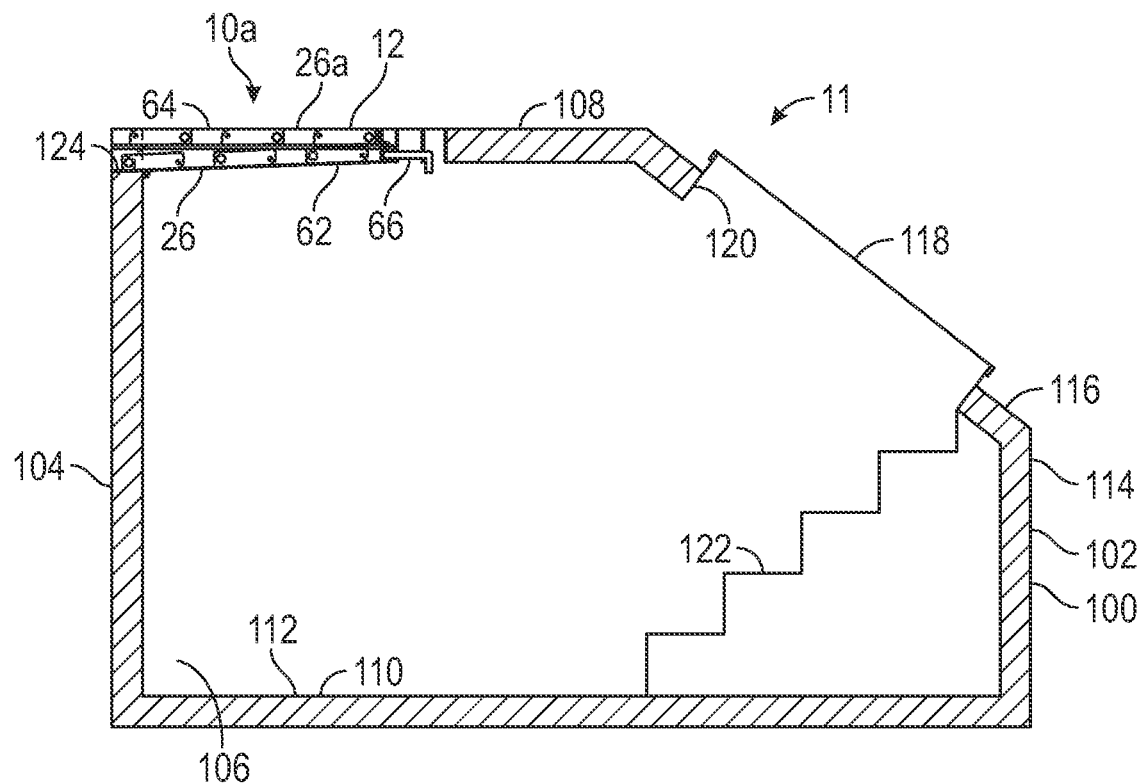
FIG. 7 is a sectional view of a storm shelter constructed with another embodiment of an escape door assembly illustrated in a closed position.
Figure 9:
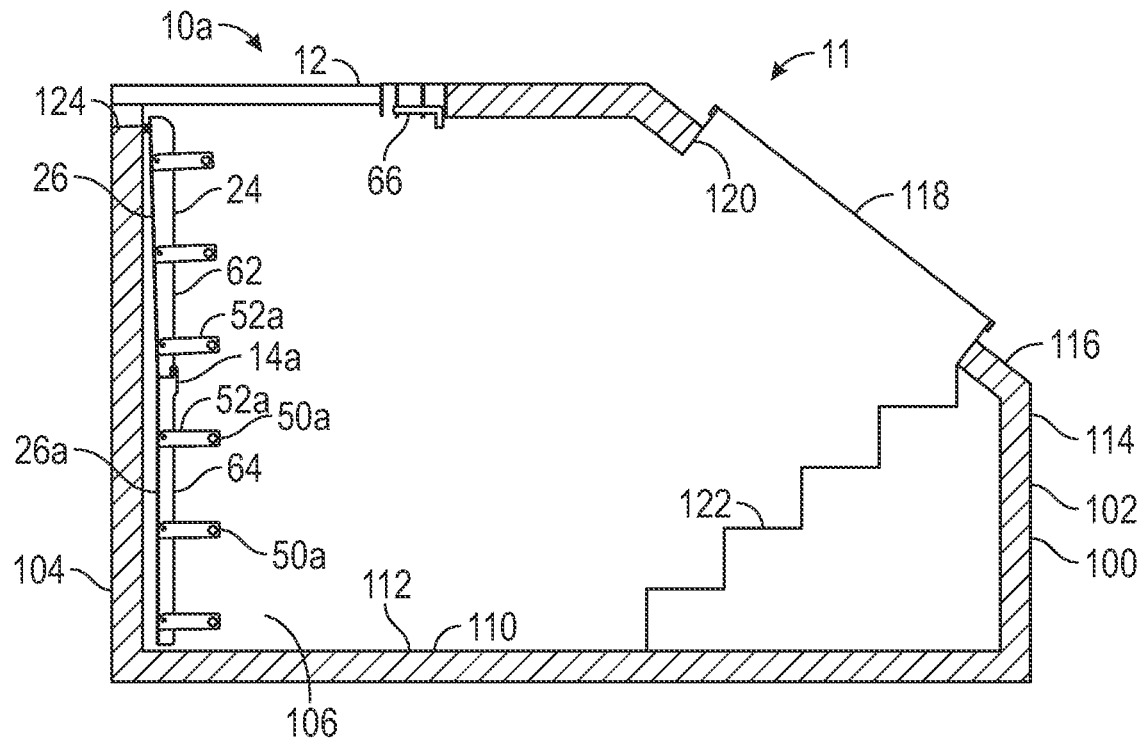
FIG. 9 is a sectional view of the storm shelter of FIG. 7 illustrating the escape door assembly of FIG. 7 in an open position.

Referring now to the drawings, and more particularly to FIGS. 1-3, 7, and 9, an escape door assembly 10 for storm shelters, such as storm shelter 11 shown in FIGS. 7 and 9, is illustrated. The escape door assembly 10 opens inwardly into the storm shelter so it is can be opened from within the storm shelter 11 when debris has fallen on the escape door assembly 10. Additionally, the escape door assembly 10 prevents water from entering the storm shelter 11 when the escape door assembly 10 is closed. While indicated as being an escape door, the escape door assembly 10 can be utilized as a primary storm shelter door or it can be used as a secondary door.

With reference to FIGS. 1-6, in one embodiment the escape door assembly 10 includes a frame 12 and a door 14 hinged to the frame 12. In one embodiment, the frame 12 includes three inner sidewalls 16, an open end 18, and a horizontal attachment plate 20 extending outwardly along upper edges 22 of the inner sidewalls 16. The door 14 may have three outer sidewalls 24 joined by a door face 26. The door 14 is hinged to the frame 12 adjacent the open end 18 and below the horizontal attachment plate 20 so the door 14 is openable in an inward direction away from the horizontal attachment plate 20. When the door 14 is in a closed position, the door face 26 angles downwardly toward the open end 18 to cause water to run off the door 14.

When the door 14 is in a closed position, the outer sidewalls 24 of the door 14 overlap or fit about the outside of the inner sidewalls 16 of the frame 12 so water falling onto the door 14 does not pass into the storm shelter. Water flows by gravity along the downward sloping door face 26 and may flow off the door face 26 at the open end 18.

Figure 2:
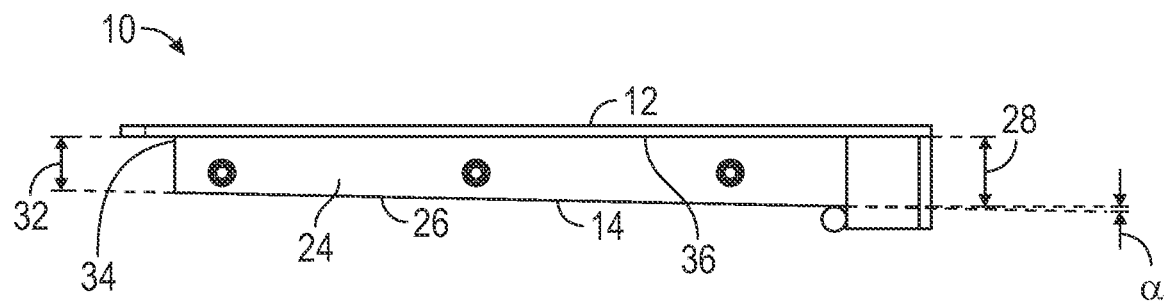
FIG. 2 is a side view of the escape door assembly of FIG. 1.

In one embodiment, and as shown in FIG. 2, the downward slope of the door face 26 is provided by having a greater height 28 of the outer sidewall 24 at a hinged end 30 of the door 14, relative to a height 32 of the outer sidewall 24 at an opposite end 34 of the door 14. The frame 12 can be positioned roughly horizontal on a storm shelter and upper edges 36 of the outer sidewall 24 can be similarly horizontal; however, the height difference between the hinged end 30 of the door 14 and the opposite end 34 of the door 14 creates an angle α causing water, such as for example rain water accompanying a severe weather event, to run down the door face 26 and through the open end 18 rather than pass into the storm shelter.

In another embodiment (not shown), the door may be constructed to have four outer sidewalls. In this case, the fourth sidewall may include one or more openings to permit water drainage.

Figure 3:
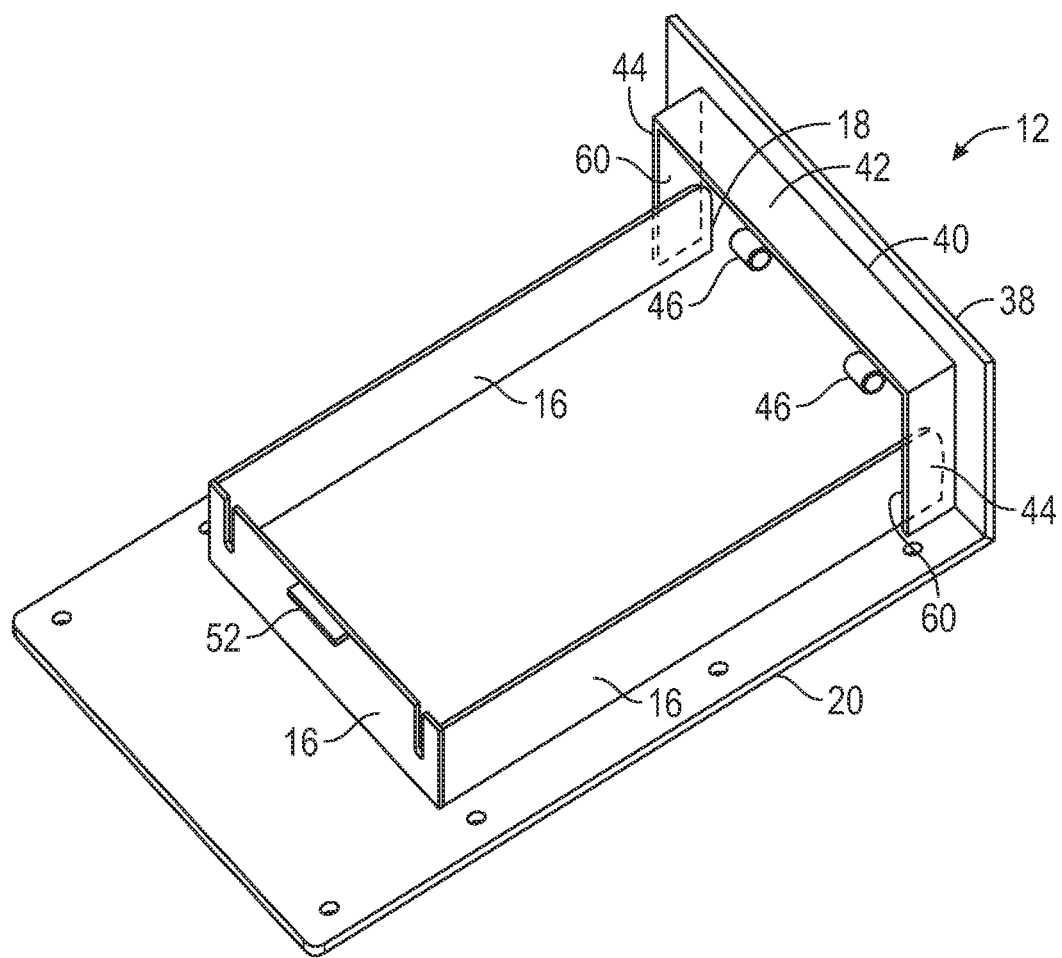
FIG. 3 is a bottom, perspective view of a frame of the escape door assembly of FIG. 1.

As shown in a bottom view in FIG. 3, in one embodiment the frame 12 includes a vertical attachment plate 38 extending about the open end 18 of the frame 12. A mounting truss 40 is attached to both the horizontal attachment plate 20 and the vertical attachment plate 38. The mounting truss 40 has a bottom truss plate 42 and side truss plates 44. A first hinge part 46 is secured to the bottom truss plate 42 for connecting to an opposing hinge part 48 secured to the door 14 (shown in FIGS. 4-6). The mounting truss 40 is positioned about the inner sidewall 16 leaving a space or gap 60 between the side truss plates 44 and opposing portions of the inner sidewall 16 for receiving the outer sidewalls 24 of the door 14.

Figure 4:
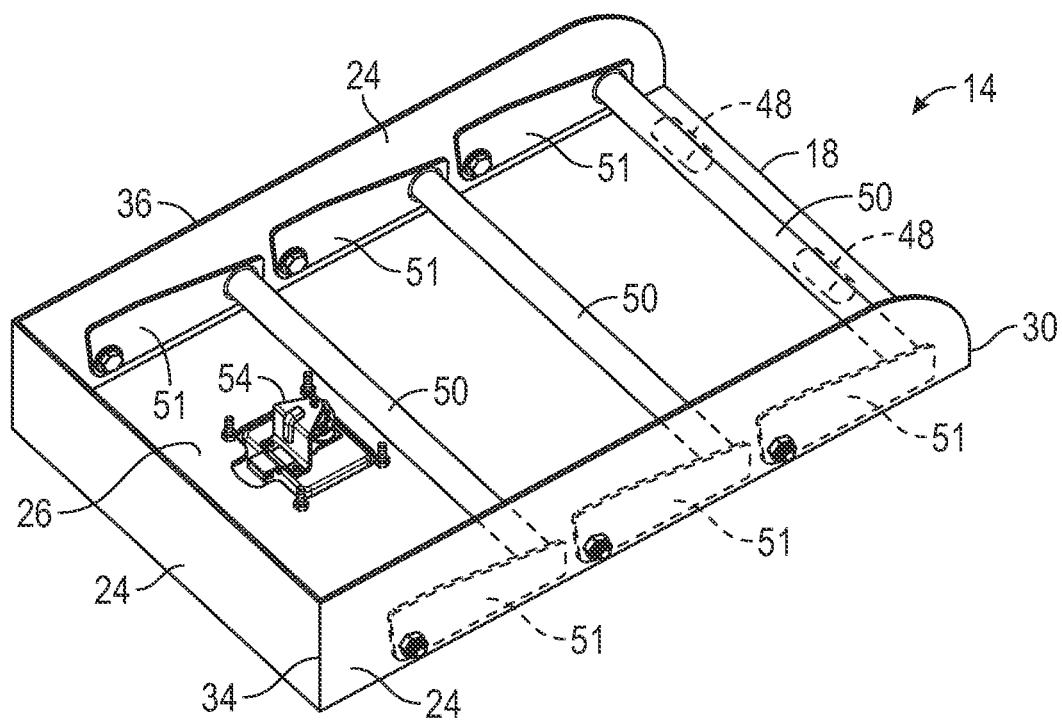
FIG. 4 is a top, perspective view of a door of the escape door assembly shown with only one rung.
Figure 5:
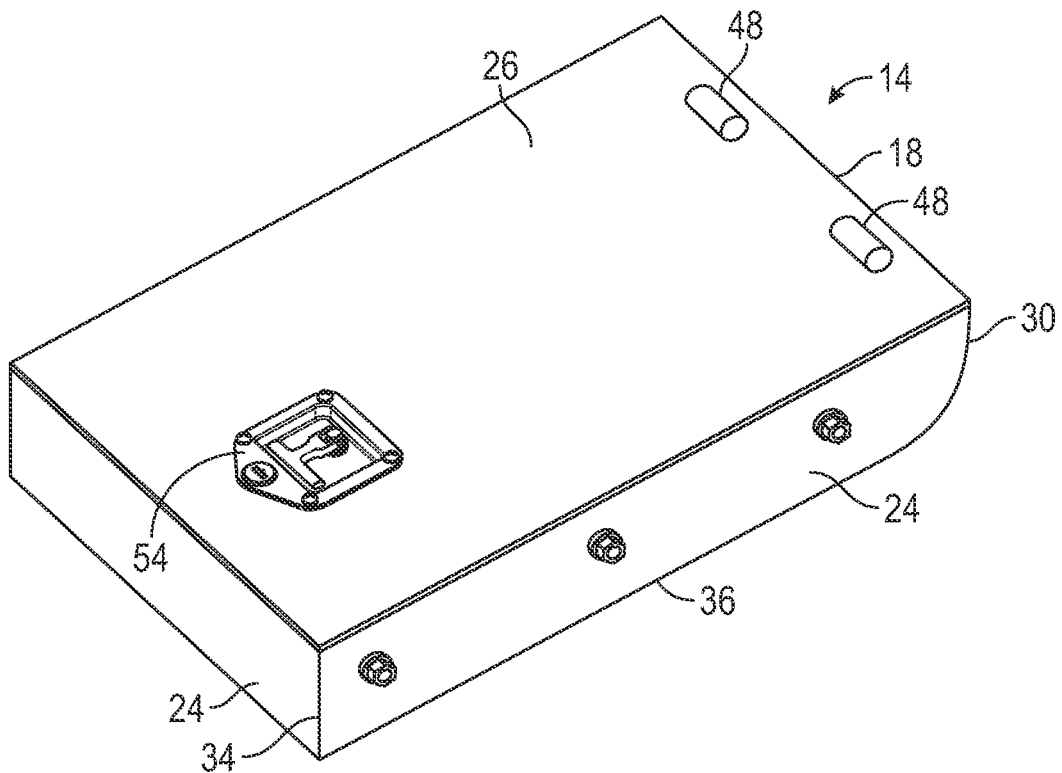
FIG. 5 is a bottom, perspective view of the door shown in FIG. 4.

In one embodiment, as shown in FIGS. 4 and 5, the door 14 includes opposing hinge part(s) 48 secured to the underside of the door face 26 for hingedly attaching to the first hinged part(s) 46 on the bottom truss plate 42 of the frame 12. The hinge can be of any type known in the art and suitable for use with the load expected for a storm shelter door. For example, the hinge can be a barrel hinge, a slip joint hinge, a pin hinge, a stop hinge, and the like.

The door 14 may include a plurality of rungs 50 to facilitate passage to and from the storm shelter 11 via the escape door assembly 10. The rungs 50 can be positioned roughly parallel and evenly spaced to provide a ladder when the door 14 is in the open position. In one embodiment, and as shown in FIG. 3, the rungs 50 are attached to pairs of arms 51, wherein the arms 51 are hingedly attached to the outer sidewall 24 of the door 14 so each rung 50 can be positioned and maintained in a climbing configuration when the door 14 is in the open position. The rungs 50 can also be conveniently folded back into the door 14 as shown in FIG. 3.

In one embodiment, a first latch part 52 (FIG. 3) attached to an inner sidewall 16 of the frame 12 can be removably connected to a second latch part 54 on the door face 26 so the door 14 remains in a closed position until the first and second latch parts 52 and 56, respectively, are disconnected. Such latches are well known to those in the art.

Figure 6:
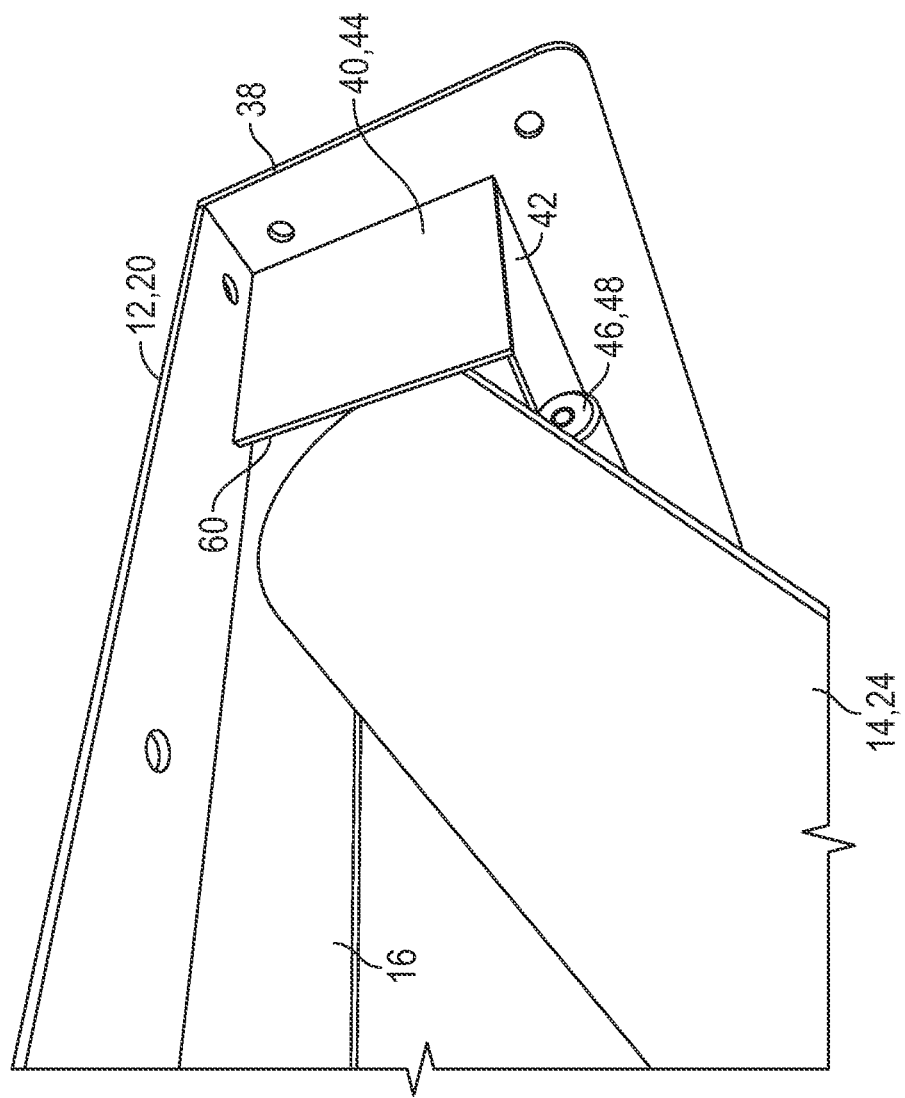
FIG. 6 is a perspective view of a portion of the escape door assembly illustrating the door in an open position.

The embodiment shown in FIG. 6 illustrates the water tight nature of the storm shelter escape door assembly 10 and specifically the attachment of the door 14 to the frame 12. In a closed configuration, the outer sidewall 24 of the door 14 fits within the gap 60 between the side truss plates 44 and the inner sidewall 16, while the hinged end 30 of the door 14 rests against the bottom truss plate 38, ensuring that water does not leak around the door 14.

Turning now to FIG. 7, another embodiment of an escape door assembly 10a is shown incorporated with the storm shelter 11. The storm shelter 11 includes a body 100 having a front wall 102, a rear wall 104, two side walls 106 (only one being visible in FIG. 7), a roof 108, and a floor 110 to define an interior chamber 112. The front wall 102 may include a vertical portion 114 and an angled portion 116. A first or primary door 118 may be hinged to the front wall 102 (either the vertical portion 114 or the angled portion 116) so the first door 118 is movable between a closed position (FIGS. 7 and 8), wherein the first door 118 covers an opening 120 through the front wall 102, and an open position (not shown), wherein ingress and egress is permitted through the opening 120. A set of stairs 122 may extend downwardly from the opening 120.

The body 100 of the storm shelter 11 may be made from materials that are lightweight, durable, and water-resistant. In one embodiment, the material forming the body 100 is concrete and may have a thickness of about four to about six inches, by way of example. The dimensions of the body 100 may be varied to accommodate the individual user's occupancy needs.

The escape door assembly 10a is similar to the escape door assembly 10 described above, except as noted below. The escape door assembly 10a is positioned in an opening 124 formed in the roof 108. The opening 124 may be formed during original construction of the body 100, or the opening 124 may be formed to retrofit the storm shelter 11 with the escape door assembly 10. To promote drainage away from the escape door assembly 10, the opening 124 may intersect one of the walls of the body 100. FIGS. 7 and 9 illustrate the opening 124 intersecting the rear wall 104. But it will be appreciated that the opening 124 may alternatively intersect one of the side walls 106. The horizontal attachment plate 20 of the frame 12 can be mounted above the opening 124 of the body 100 and the vertical attachment plate 38 can be mounted to the rear wall 104 using methods known to those in the art. For example, the frame 12 may be bolted to the body 100.

The escape door assembly 10a includes a door 14a, shown in a closed position. The door 14a includes a first section 62 hinged to a second section 64, as shown close-up in FIG. 8. The first and second hinged sections 62 and 64, respectively, fold together when the door 14a is in a closed position so the first section 62 lies below the second section 64. The first section 62 comprises the door face 26. The door 14a can be locked in the closed position using a latching mechanism 66, similar to that described above with reference to FIGS. 3 and 4, or other locking mechanism, such as those known in the art and suitable for use with a storm shelter.

In one embodiment, the second section 64 also includes a door face 26a, which is positioned on top when the storm shelter escape door assembly 10a is in a closed configuration. While unnecessary for maintaining the water tight aspects of the storm shelter escape door assembly 10, this additional door face 26a offers a protective covering for the storm shelter escape door assembly 10a. This is also a safety feature for children and pets in the vicinity.

Figure 8:
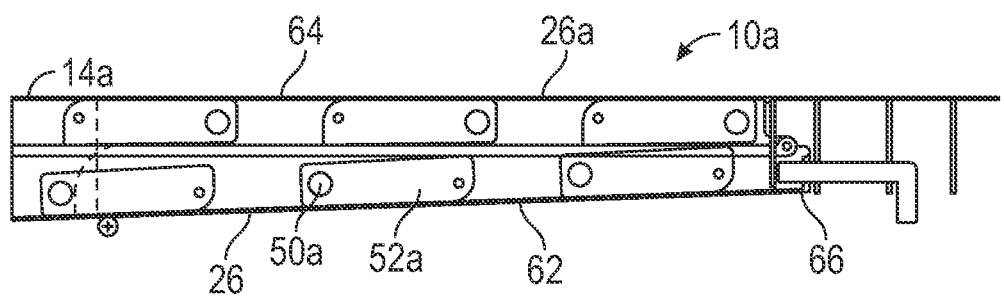
FIG. 8 is an enlarged view of the escape door assembly of FIG. 7.

Although the door 14a in FIGS. 7 and 8 is shown in two sections, the door 14a could comprise a single section or could comprise more than two sections.

Figure 10:
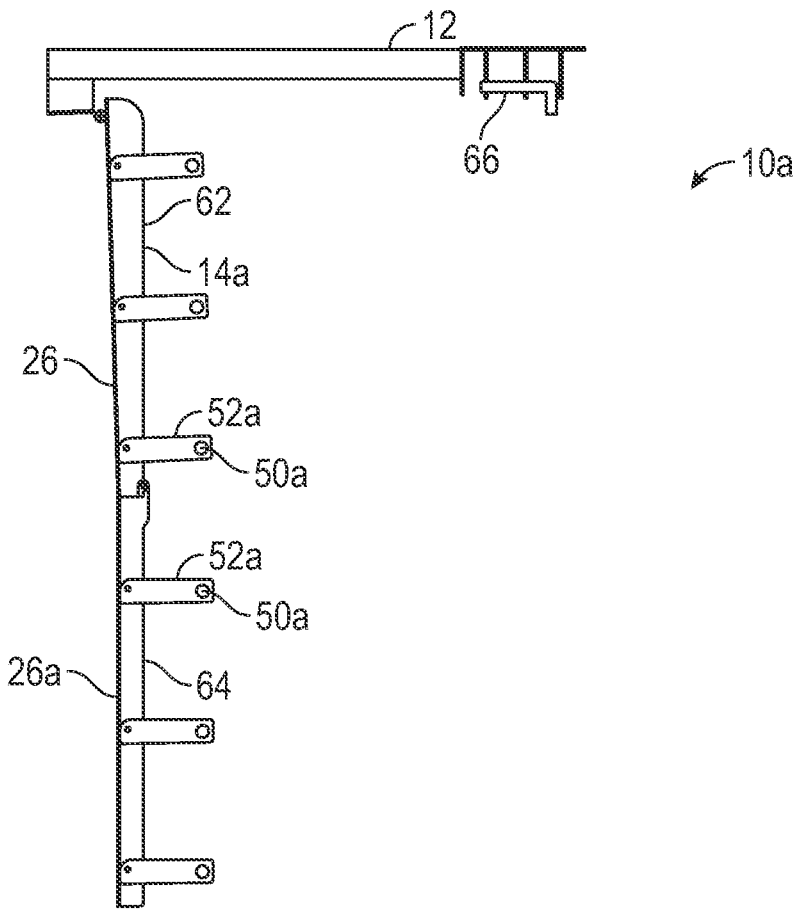
FIG. 10 is an enlarged view of the escape door assembly of FIG. 9.

In one embodiment, and as shown in FIGS. 9 and 10, in an open position, the door 14a extends into the storm shelter 11 and can include a plurality of rungs 50a to facilitate passage to and from the storm shelter 11 via the escape door assembly 10a. The rungs 50a can be positioned roughly parallel and evenly spaced to provide a ladder when the door 14a is in the open position.

In one embodiment, and as shown in FIGS. 9 and 10, the rungs 50a are attached to pairs of arms 52a, wherein the arms 52a are hingedly attached to the outer sidewall 24 of the door 14a so each rung 50a can be positioned and maintained in a climbing configuration. The rungs 50a can also be conveniently folded back into the door 14a as shown in FIGS. 7 and 8.

Another embodiment of the presently disclosed inventive concept(s) is directed to a storm shelter having the escape door assembly described above. Storm shelters are well known in the art, and therefore no further discussion thereof is deemed necessary.

Although the presently disclosed inventive concepts has been described in conjunction with the specific language set forth herein above, many alternatives, modifications, and variations will be apparent to those skilled in the art. Accordingly, it is intended to embrace all such alternatives, modifications, and variations that fall within the spirit and broad scope of the presently disclosed inventive concepts. Changes may be made in the construction and the operation of the various components, elements, and assemblies described herein, without departing from the spirit and scope of the presently disclosed inventive concepts.

What is claimed is:

1. An escape door assembly for a storm shelter, comprising:
   a frame comprising:
      a plurality of inner sidewalls defining a U-shaped wall with an open end and an upper edge;
      a horizontal attachment plate extending outwardly from the upper edge; and
      a plurality of side truss members and a bottom truss member connected to define a U-shaped mounting truss having an open end, the side truss members connected to the horizontal attachment plate near the open end of the U-shaped wall with the mounting truss in a perpendicular relationship to the U-shaped wall and the side truss members spaced from and positioned outwardly of the U-shaped wall; and
   a door having a plurality of outer sidewalls defining a U-shaped wall with an upper edge and a lower edge and a door face connected to the lower edge and extending across an entirety of the U-shaped wall of the door, the door hinged to the bottom truss member so the door is movable between a closed position wherein the outer sidewalls of the door are positioned adjacent and outwardly relative to the inner sidewalls of the frame and an open position wherein the door is rotated downwardly away from the horizontal attachment plate,
   wherein the door face angles downwardly toward the open end of the U-shaped wall of the door when the door is in the closed position.

2. The escape door assembly of claim 1, wherein the frame further comprises a vertical attachment plate extending outwardly from the side truss members and the bottom truss member.

3. The escape door assembly of claim 1, wherein the door further comprises a plurality of rungs, the ends of which are connected to the outer sidewalls, the rungs positioned parallel and evenly spaced to provide a ladder when the door is in the open position.

4. The escape door assembly of claim 1, wherein the door comprises two sections hinged relative to one another.

5. The escape door assembly of claim 4, wherein each of the two sections has a door face.

6. A storm shelter, comprising:
   a body having a front wall, a rear wall, two side walls, a roof, and a floor defining an interior chamber, a first opening formed in the front wall, and a second opening formed in at least the roof;
   a first door assembly hinged to the front wall so the first door is movable between a closed position wherein the first door covers the first opening, and an open position wherein ingress and egress are permitted through the first opening; and
   a second door assembly, comprising:

a frame comprising:
- a plurality of inner sidewalls defining a U-shaped wall with an open end and an upper edge;
- a horizontal attachment plate extending outwardly from the upper edge and mounted to the roof of the body about the second opening of the body; and
- a plurality of side truss members and a bottom truss member connected to define a U-shaped mounting truss having an open end, the side truss members connected to the horizontal attachment plate near the open end of the U-shaped wall with the mounting truss in a perpendicular relationship to the U-shaped wall and the side truss members spaced from and positioned outwardly of the U-shaped wall; and a door having a plurality of outer sidewalls defining a U-shaped wall with an upper edge and a lower edge and a door face connected to the lower edge and extending across an entirety of the U-shaped wall of the door, the door hinged to the bottom truss member so the door is movable between a closed position wherein the outer sidewalls of the door are positioned adjacent and outwardly relative to the inner sidewalls of the frame and an open position wherein the door is rotated downwardly into the interior chamber of the body in an inward direction away from the horizontal attachment plate, wherein the door face angles downwardly toward the open end of the U-shaped wall of the door when the door is in the closed position.

7. The storm shelter of claim 6, wherein the second opening of the body intersects at least one of the rear wall and one of the side walls, and wherein the frame further comprises a vertical attachment plate extending outwardly from the side truss members and the bottom truss member, the vertical attachment plate mounted to at least one of the rear wall and one of the side walls.

8. The storm shelter of claim 6, wherein the door further comprises a plurality of rungs, the ends of which are connected to the outer sidewalls, the rungs positioned parallel and evenly spaced to provide a ladder when the door is in the open position.

9. The storm shelter of claim 6, wherein the door comprises two sections hinged relative to one another.

10. The storm shelter of claim 9, wherein each of the two sections has a door face.

* * * * *